(No Model.)
S. M. KELLOGG & E. T. SHELDON.
Portable Soda Fountain.
No. 232,187. Patented Sept. 14, 1880.
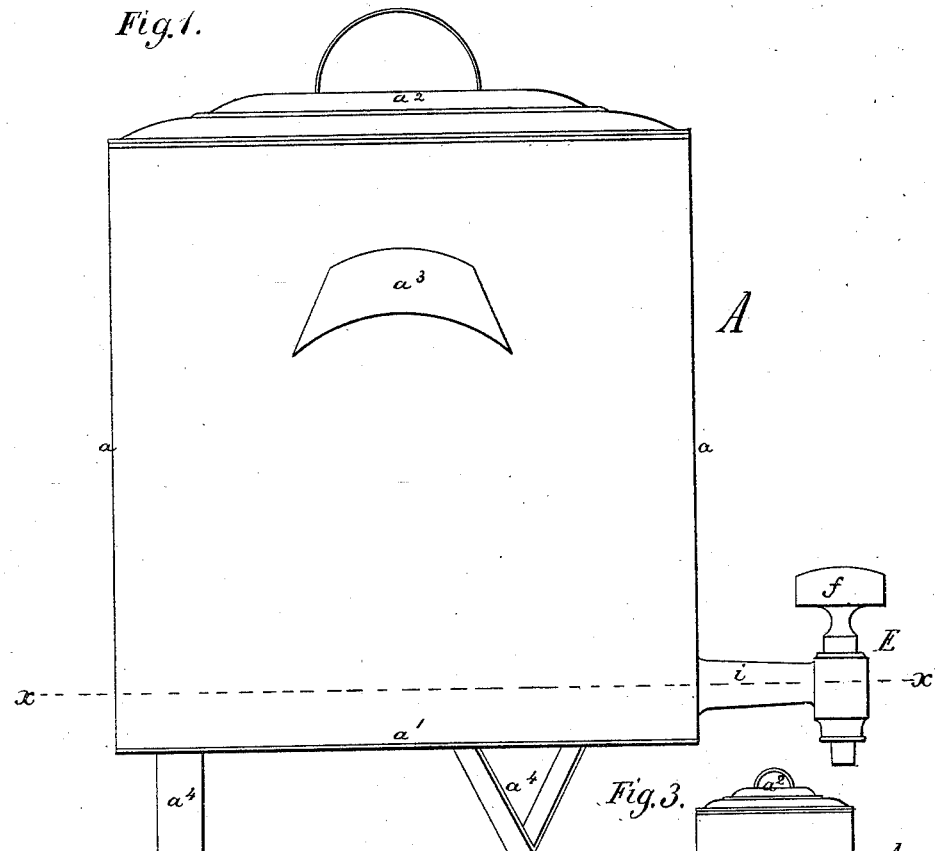
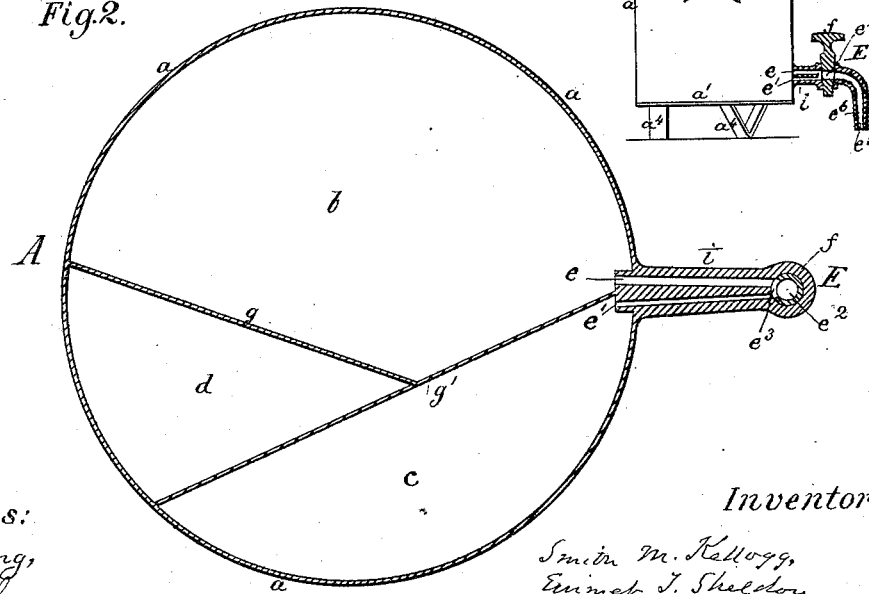
Witnesses:
J. P. Theo. Lang,
H. A. Hall.
Inventors:
Smith M. Kellogg,
Emmet T. Sheldon,
by Munn, Fenwick & Lawrence, attys.

UNITED STATES PATENT OFFICE.

SMITH M. KELLOGG AND EMMET T. SHELDON, OF OMRO, WISCONSIN.

PORTABLE SODA-FOUNTAIN.

SPECIFICATION forming part of Letters Patent No. 232,187, dated September 14, 1880.

Application filed June 26, 1880. (No model.)

*To all whom it may concern:*

Be it known that we, SMITH M. KELLOGG and EMMET T. SHELDON, citizens of the United States, residing at Omro, Winnebago county, State of Wisconsin, have invented a new and useful Improvement in Soda-Fountains; and we do hereby declare that the following is a full, clear, and exact description thereof, reference being had to the accompanying drawings, and letters of reference marked thereon, forming a part of this specification, in which drawings—

Figure 1 is a side elevation of our improved soda-fountain, and Fig. 2 a horizontal section of the same in the line $x$ $x$ of Fig. 1. Fig. 3 is a view, partly in section and partly in elevation, of the improved fountain, the body of the fountain being shown in elevation and its faucet in longitudinal vertical central section.

The object of our invention is the production of a very cheap portable reservoir or soda-fountain, which can be used as a substitute for the stationary and expensive soda-fountains now in general use, and from one apartment of which the sirup for a glass of soda-water can be drawn simultaneously with the drawing of water impregnated with bicarbonate of soda from another apartment, the two liquids commingling in the act of their simultaneous flow through a single faucet which communicates with both apartments, the channels of the faucet which communicate with the said two apartments being of such relative size that while a glass of the beverage is being drawn from the fountain one of the channels will permit the flow from the sirup-apartment of a sufficient amount of sirup, while the other channel will permit the flow from another apartment of a sufficient amount of water mixed with bicarbonate of soda to constitute the proper proportions of each liquid for a glass of soda; and further, that while the material of which the fountain is constructed is such as to make the cooling quality of the ice employed available to the greatest extent, all artificial pressure for forcing the carbonated water from the fountain is dispensed with, thereby cheapening the process of producing soda-water.

In the drawings, A indicates the fountain complete as a whole construction. For convenience and cheapness it is made of a circular body portion, $a$, with a closed bottom, $a'$, a closely-fitting but removable cover, $a^2$, handles $a^3$, and three supporting-legs, $a^4$, (one not shown in the figures.) Interiorly it is divided into apartments $b$, $c$, and $d$ by thin division-plates, as at $g$ and $g'$.

In practice the apartment $b$ is to contain water, with the proper proportion of bicarbonate of soda dissolved therein, and the apartment $c$ is to contain the sirup, with tartaric acid dissolved therein, together with such other ingredients as compose a suitable sirup for the production of soda-water, while the apartment $d$ is to contain the ice to keep the liquids cool.

E indicates the faucet for drawing off the liquid contents of the fountain, and is applied thereto, as shown. This faucet has its stem $i$ made of solid metal, but provided with longitudinal perforations, as at $e$ and $e'$, thus forming channels through which the liquids of the fountain are drawn off.

The channel or perforation $e$ communicates with the apartment $b$ on one side of the division-plate $g'$, while the channel $e'$ communicates with the apartment $c$ on the other side of the division-plate $g'$, as shown, said division-plate $g'$ being so connected with the faucet-stem $i$ that the liquid in the apartment $c$ can only escape through the channel $e'$, while the liquid in the apartment $b$ can only escape through the channel $e$, as clearly signified in Fig. 2. These channels $e'$ and $e$ are made of unequal size, and of such relative size or capacity of discharge that while a glass of the beverage is being drawn off from the fountain the channel $e'$ will only permit the flow from the apartment $c$ of a sufficient amount of sirup, while the channel $e$ will permit the flow from the apartment $b$ of a sufficient amount of its liquid contents to constitute the proper proportion of each of the liquids for a glass of soda.

As shown in Fig. 2, the thumb-plug $f$ is made a portion of its length with a tubular opening, as at $e^2$, and with a side opening, $e^3$, communicating therewith, the opening $e^3$ being made of sufficient capacity to register with both of the channels $e$ and $e'$, when the thumb-plug is in the position indicated in said figure, in which case the two liquids in the act of being drawn off from apartments $b$ and $c$ will unite at the opening $e^3$, and commingle during their downward flow through the tubular opening $e^2$ of the thumb-plug $f$, and so discharge into any proper receptacle held beneath the thumb-plug.

In Fig. 3 we have shown a thumb-plug made solid its whole length, except with a transverse opening, $e^4$, through it, as shown, said opening $e^4$ being made to register with the channels $e$ and $e'$, as well as with the channel $e^5$ of the downwardly-bent tube $e^6$, through which the liquids in being drawn off will escape into a glass held beneath when the thumb-plug is in the position shown in Fig. 3, said liquids commingling during their passage through the tube $e^6$.

It will thus be seen that we effect the commingling of the liquids during the act of drawing them off simultaneously through a single faucet, and that we obviate the necessity of charging the fountain with gas, as is ordinarily practiced, in order to produce an agitation and consequent commingling of the liquids composing the beverage. The moment the two liquids come together in passing through the faucet effervescence at once commences, due to the union of the two liquids, and the two liquids then in a lively, agitated, and effervescing state escape from the faucet into a glass held beneath. Thus we are enabled to make our fountain of light sheet metal, no artificial pressure being required within it, and also make it portable as well as cheap, and at the same time are enabled to deliver the beverage to customers in the usual effervescing or foaming condition, and at a less cost than furnished from the stationary and expensive fountains now generally in use.

It is obvious that when the thumb-plug $f$ is in the position shown in the figures the flow of the liquids will be instantly stopped by properly turning the plug.

We do not confine ourselves to the particular form of the fountain A shown in the figures. It may be made in the form of an oblong square, with, for instance, several sirup-apartments—one for raspberry sirup, one for vanilla sirup, and so on—and yet have each of the several sirups drawn off through a faucet simultaneous with and in union with the proper amount of water mixed with bicarbonate of soda, and in proper proportions for a glass of soda-water.

We claim—

1. In a soda-water fountain having two or more independent chambers and independent fluid-channels in communication with a single draw-off cock, the partition $g'$ of the body $a$, arranged to separate the channels $e\ e'$, and with the partition $g$, to form soda-water chamber $b$, sirup-chamber $c$, and ice-chamber $d$, as shown and described.

2. The body $a$ of the fountain, provided with soda-water chamber $b$, ice-chamber $d$, sirup-chamber $c$, cock E, having channels $e\ e'$ of relatively small and large diameters, separated by the partition $g'$, which, together with partition $g$, forms the vertical chambers $b\ c\ d$, substantially as described.

3. The body $a$, provided with a partition, $g'$, and a double-channeled cock, E, the said partition abutting against the inner end of the cock, and thereby forming chambers $b\ c$ and separating the channels $e\ e'$ of the cock, substantially as described.

4. The soda-water fountain A, provided with a double-channeled draw-off and mixing cock, E, which has relatively large and small channels $e\ e'$, said channels being in communication with chambers $b$ and $c$ and with the passage $e^2$, substantially as described.

SMITH M. KELLOGG.
EMMET T. SHELDON.

In presence of—
N. FRANK,
R. E. ANDREWS.